United States Patent
O'Shea et al.

(10) Patent No.: US 11,106,612 B2
(45) Date of Patent: Aug. 31, 2021

(54) COORDINATING OPERATIONS OF MULTIPLE COMMUNICATION CHIPS VIA LOCAL HUB DEVICE

(71) Applicant: Apple Inc., Cupertino, CA (US)

(72) Inventors: Helena Deirdre O'Shea, San Jose, CA (US); Matthias Sauer, San Jose, CA (US); Jorge L. Rivera Espinoza, San Jose, CA (US); Bernd Adler, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/885,935

(22) Filed: May 28, 2020

(65) Prior Publication Data

US 2021/0089483 A1 Mar. 25, 2021

Related U.S. Application Data

(60) Provisional application No. 62/903,578, filed on Sep. 20, 2019.

(51) Int. Cl.
*G06F 13/36* (2006.01)
(52) U.S. Cl.
CPC .......... *G06F 13/36* (2013.01); *G06F 2213/40* (2013.01)
(58) Field of Classification Search
None
See application file for complete search history.

(56) References Cited

U.S. PATENT DOCUMENTS

| | | | |
|---|---|---|---|
| 6,499,079 B1 * | 12/2002 | Gulick | G06F 13/36 710/100 |
| 9,119,215 B2 * | 8/2015 | Linsky | H04L 12/407 |
| 9,135,197 B2 | 9/2015 | Wietfeldt et al. | |
| 9,185,719 B2 | 11/2015 | Wietfeldt et al. | |
| 2011/0268024 A1 * | 11/2011 | Jamp | H04L 1/1829 370/328 |
| 2013/0003671 A1 | 1/2013 | Wang et al. | |
| 2019/0042518 A1 * | 2/2019 | Marolia | G06F 9/45558 |
| 2019/0227962 A1 | 7/2019 | O'Shea et al. | |
| 2019/0227971 A1 | 7/2019 | O'Shea et al. | |
| 2019/0335538 A1 * | 10/2019 | Gopal | H04B 1/3805 |

FOREIGN PATENT DOCUMENTS

WO WO 2018/125989 A2 7/2018

OTHER PUBLICATIONS

PCT International Search Report and Written Opinion, PCT Application No. PCT/US2020/037053, dated Oct. 22, 2020, 15 pages.

* cited by examiner

*Primary Examiner* — Elias Mamo
(74) *Attorney, Agent, or Firm* — Fenwick & West LLP

(57) ABSTRACT

Embodiments relate to coordinating the operations of subsystems in a communication system of an electronic device where a coexistence hub device monitors the state information transmitted as coexistence messages over one or more multi-drop buses, processes the monitored coexistence messages and sends out control messages as coexistence messages to other systems on chips (SOCs). The coexistence hub device can also update the operations of the communication system. The coexistence hub device may receive an operation policy from a central processor and may execute the operation policy without further coordination of the central processor. The coexistence hub device broadcasts the control messages as coexistence messages according to the executed operation policy.

20 Claims, 8 Drawing Sheets

| Request in Coexistence Message | Possible Responses |
|---|---|
| Change Frequence Band | Accept, Reject, Notify Alternative Frequency Band |
| Increase Transmit Power | Accept, Reject, Permit Smaller Power Increase |
| Decrease Transmit Power | Accept, Reject, Permit Smaller Power Decrease |
| Change Antenna | Accept, Reject, Notify Alternative Antenna |
| Power On | Accept, Reject |
| Power Off | Accept, Reject |

*FIG. 8*

COORDINATING OPERATIONS OF MULTIPLE COMMUNICATION CHIPS VIA LOCAL HUB DEVICE

CROSS-REFERENCE TO RELATED APPLICATION

This application claims priority under 35 U.S.C. § 119(e) to U.S. Provisional Patent Application No. 62/903,578 filed on Sep. 20, 2019, which is incorporated by reference herein in its entirety.

BACKGROUND

1. Field of the Disclosure

The present disclosure relates to coordinating operations of multiple integrated circuit (IC) chips in an electronic device.

2. Description of the Related Art

Electronic devices may include multiple systems on chips (SOCs) for communicating with other devices using various communication protocols. As the size of a communication system in an electronic device becomes smaller while the functionality of the communication system increases, more SOCs are incorporated into the electronic device or more subsystems are added to each SOC. These SOCs may communicate with a host (e.g., a central processor or an application processor) over a dedicated communication path (e.g., peripheral component interconnect express (PCIe)) to transmit data.

As a result of integrating multiple communication systems and other subsystems in the electronic device, various issues or complications may arise. These issues or complications include, among others, collision in terms of resource usage, interference in shared or overlapping communication bands, mutually incompatible modes of operations, and isolation between antennas. In conventional electronic devices, such issues or complications are generally resolved by coordinating the operations of the SOCs by having the central processor resolve problematic situations by coordinating operations across the multiple SOCs.

SUMMARY

Embodiments relate to a communication hub device that autonomously controls the operations of other SOCs in a communication system over a multi-drop bus shared across the communication hub device and the other SOCs. The communication hub device receives, stores and executes an operation policy without further intervention of a central processor or limited intervention by the central processor. The communication hub device or other SOCs broadcast coexistence messages over the multi-drop bus, which is received and processed at the communication hub device and the other SOCs, to coordinate their operations according to the operation policy.

BRIEF DESCRIPTION OF THE DRAWINGS

Figure (FIG.) 1 is a high-level diagram of an electronic device, according to one embodiment.

FIG. 8 is a table illustrating a request in a coexistence message, and corresponding possible responses made by the coexistence hub device, according to one embodiment.

Figure 1:
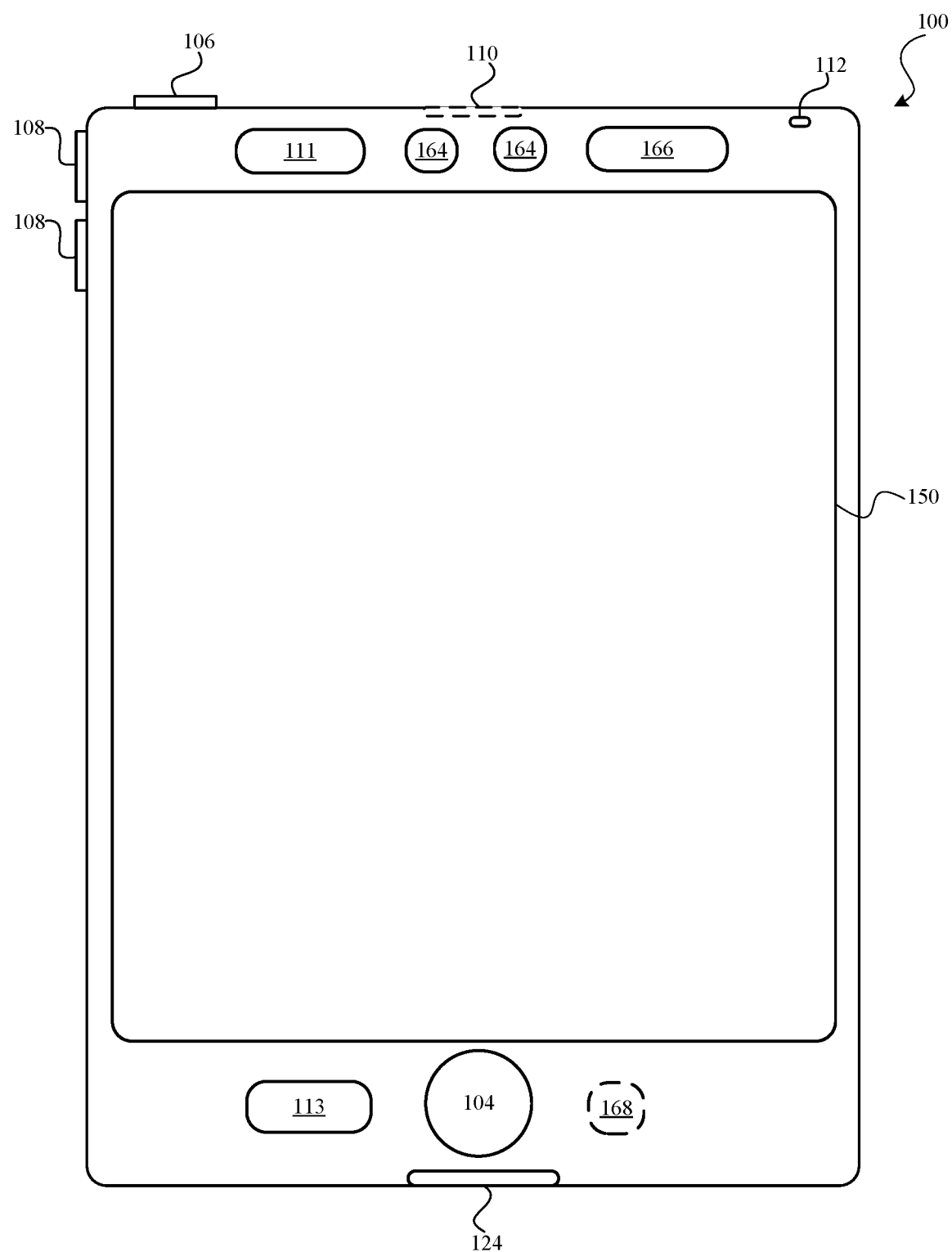

The figures depict, and the detailed description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to coordinating the operations of subsystems in a communication system of an electronic device where a coexistence hub device monitors the state information transmitted as coexistence messages over one or more multi-drop buses, processes the monitored coexistence messages and sends out control messages as coexistence messages to other SOCs in the electronic device as well as to local communication systems within the Hub. The coexistence hub device can also update the operations of the communication system. The coexistence hub device may receive an operation policy from a central processor (e.g., application processor) and may execute the operation policy without further coordination of the central processor or with reduced operations of the central processor. The coexistence hub device broadcasts the control messages as coexistence messages according to the executed operation policy. The other SOCs receives and filters the control messages relevant to their operations and adjust their operations accordingly. The central processor may advantageously remain in a low power mode or be turned off while the coexistence hub device executed the operation policy, and thereby, reduce power consumption of the electronic device. Further, by obviating the intervention of the central processor, the coordination operations can be performed with a faster speed.

The coexistence message described herein refers to a message exchanged between components in an electronic device based on which the operations of the components are coordinated. The coexistence message may be a state message indicating the status of a system, a control message for controlling operations of a system or a component in the system. The system associated with the coexistence message may include, but is not limited to, a communication system and a sensor system. The coexistence message, for example, indicate airtime radio state or importance of a radio link traffic of a communication subsystem at a certain time which is then used in the adjustment of duty cycles between two or more communication subsystems.

The coexistence hub device described herein refers to a device that is capable of autonomously coordinating the operations of coexisting components in a communication device without further intervention by a central processor or with reduced intervention by the central processor. The coexistence hub device may include its own subsystems that perform communication operations. The coexistence hub device may be embodied as a separate chip or a part of a larger circuit.

Example Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG.) 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional image sensors 164 as the rear cameras of device 100.

Example Communication System in Electronic Device

Figure 2:
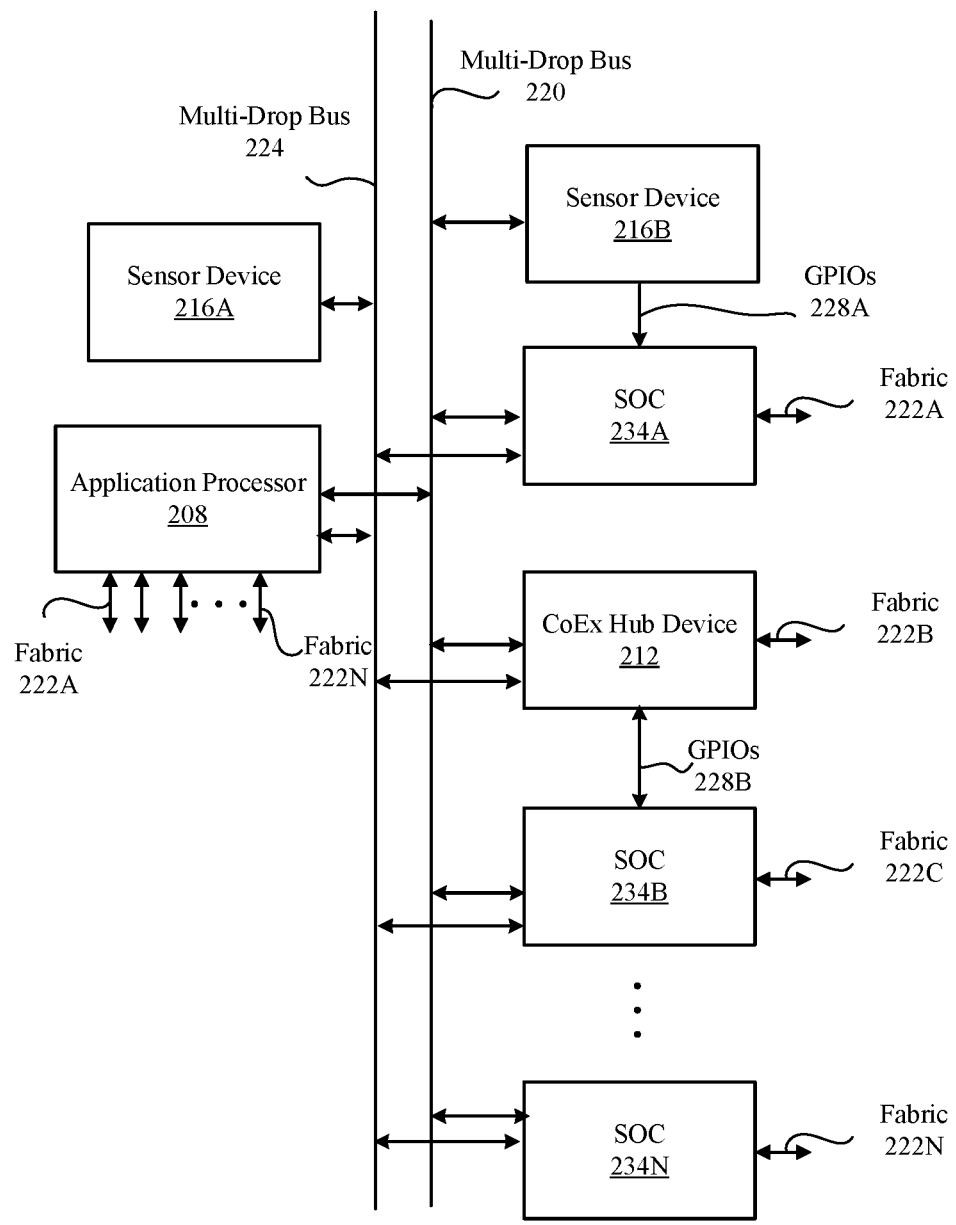
FIG. 2 is a block diagram illustrating components of the electronic device communicating over multi-drop buses, according to one embodiment.

FIG. 2 is a block diagram illustrating components of electronic device 100 communicating over multi-drop buses 220, 224, according to one embodiment. Electronic device 100 may include, among other components, an application processor 208 (also referred to as "a central processor" herein), a coexistence hub device 212 (also referred to as "a coexistence hub device" herein), SOCs 234A through 234N (collectively referred to as "SOCs 234" herein), sensor devices 216A and 216B (collectively referred to as "sensor devices 216" herein), multi-drop buses 220, 224, and fabrics 222A through 222N. The components illustrated in FIG. 2 may be part of a communication subsystem in electronic device 100. Electronic device 100 may include additional components (e.g., user interfaces) not illustrated in FIG. 2.

Application processor 208 is a processing circuit in electronic device 100 for executing various operations. Application processor 208 may include one or more processing cores for executing various software programs as well as dedicated hardware circuits for performing specialized functions such as processing images, performing security operations, performing machine learning operations, and processing audio signals. Application processor 208 may also execute operations to coordinate the operations of other components in electronic device 100 including coexistence hub device 212, SOCs 234 and sensor devices 216. Application processor 208 can operate in multiple power modes including a low power mode where application processor 208 turns off most of its components to save power consumption, and a high-power mode where most of its components are active. Application processor 208 may also incorporate one or more communication components (e.g., cellular modem) that may also be embodied as a separate SOC. In one or more embodiments, application processor 208, in the low power mode, relays data between components connected over multi-drop buses 220, 224. For this purpose, application processor 208 may (i) receive a signal from a device (e.g., SOCs 234, sensor devices 216 and coexistence hub device 212) over multi-drop bus 220, 224, (ii) modify or copy the received signal according to a predetermined rule, and (iii) send the modified signal to another device (e.g., SOCs 234, sensor devices 216 and coexistence hub device 212) over multi-drop bus 220, 224 to enable the SoCs 234 to communicate effectively.

Coexistence hub device 212 is hardware, software firmware or combinations thereof, that coordinates the operations of a communication system (including, e.g., coexistence hub device 212 and SOCs 234) and related components (e.g., sensor devices 216) in electronic device 100. For this purpose, coexistence hub device 212 stores and executes an operation policy for defining and/or coordinating the operations of the communication system and the related components. Coexistence hub device 212 may operate based on the operation policy without further intervention or with reduced intervention by application processor 208. The operation policy may for, example, determine real time operations of components in the communication system (e.g., 234) based on factors such as operating conditions of a particular communication system or the configuration of another communication system in the platform which is impacting it, the length of time a communication subsystem remained in a waiting state (e.g., denial of service), power consumption of each communication subsystem, and conditions of channels used by communication subsystems. Based on the operation policy, coexistence hub device 212 performs operations in advance to set up or prepare communication subsystems to activate or deactivate (or a component of a communication subsystem modifies its operational state due to the external conditions) so that activation or deactivation of other communication subsystems occur without any error or with reduced degradation. Coexistence hub device 212 may also include one or more communication subsystems that perform communication operations over various physical interfaces. By locally performing such coexistence operations at the communication subsystem, application processor 208 may be retained in the low power mode for a longer time despite activities in the communication subsystem, and also frees the resources of application processor 208 during its high power mode and provides a greater agility in response between the communication systems to changing conditions. Some systems may only present a coexistence issue for short intervals of time, so the multidrop bus with coexistence hub device 212 is suitable for these conditions to take some short term actions such as reducing transmit power, or changing some external coupled component's state to accommodate the other communication subsystem for the brief interval of the coexistence condition. The details of coexistence hub device 212 is described below in detail with reference to FIGS. 3 and 4. Coexistence hub device 212 may also perform functions other than coordinating the operations that were performed by application processor 208.

Each of SOCs 234 is a circuit, by itself or in conjunction with software or firmware, that performs operations for communicating with one or more external networks or devices using communication protocols or security protocols. Each of SOCs 234 and coexistence hub device 212 may handle different communication protocols and/or are associated with different wireless bands. For example, SOC 234A may perform processing for long range communication (e.g., cellular communication) while SOC 234B or coexistence hub device 212 handles short range communication (e.g., Bluetooth communication). The operations of the SOCs 234 are at least partially controlled by coexistence hub device 212. An example of SOC 234B is described below in detail with reference to FIG. 5.

Sensor devices 216 are hardware components, by themselves or in conjunction with software of firmware, that senses various properties. These sensor devices 216 generate sensor signals representing the sensed properties that can be sent to other components (e.g., SOCs 234, coexistence hub device 212, and application processor 208) for further processing. Sensor 216A may be, for example, a compass that sends a sensor signal representing an orientation of the electronic device 100 while sensor 216B may be a global positioning system (also referred to as global navigation subsystem (GNSS)) module for enhancing reception of cellular wireless signals or WiFi signals at SOC 234A. Some of sensor devices 216 may be simple standalone devices that interoperate with one or more of the SOCs 234 but nevertheless have coexistence issues with other components of electronic device 100. Other sensor devices 216 may be complex sensors with embedded processors and memory that sends or receives extensive messages with one or more of the SOCs 234.

Fabrics 222 are communication channels enabling components in the communication system to communicate with application processor 208. One or more of fabrics 222 may be embodied as point-to-point connections such as Peripheral Component Interconnect Express (PCIe), I2C, or Serial Peripheral Interface (SPI). As illustrated in FIG. 2, SOC 234A, coexistence hub device 212 and SOCs 234B through 234N communicate with application processor 208 via corresponding fabrics 222A through 222N. One or more of fabrics 222 may have high bandwidth and low latency compared to multi-drop buses 224, 220. Fabrics 222 is illustrated in FIG. 2 may be physically separate communication channel or one or more shared physical channel with multiple logical sub-channels.

Each of multi-drop buses 224, 220 is communication channel that enables multiple components to communicate over a shared connection. Multi-drop bus 220 may be used primarily to transmit coexistence messages between components in the communication system whereas multi-drop bus 224 may be used primarily to transmit sensor signals from sensor devices 216A, 216B to other components in electronic device 100. However, multi-drop buses 220, 224 may also transmit other types of signals. Further, the multi-drop buses 220, 224 may be combined into a single bus or divided into more buses. In one or more embodiments, System Power Management Interface (SPMI) is used to embody multi-drop buses 220, 224. Other serial bus interfaces such as I2C may be used instead of the SPMI to embody multi-drop buses 220, 24.

In addition to or alternative to multi-drop buses 224, 220, general-purpose input/output (GPIO) communication may be used between components within or external to the communication system. The GPIO may be used for various reasons, including but not limited to, (i) to support legacy devices, (ii) to provide a separate communication channel for time sensitive information, (iii) support low cost devices lacking or without processing capabilities for decoding coexistence messages, (iv) to enable communication with devices that may encounter issues communicating over a multi-drop bus due to, for example, exposure to interference, (v) to enable dual support of GPIO communication as well as communication over multi-drop bus. These GPIOs may be coupled together to implement a low-level coexistence policy between two components. As illustrated in FIG. 2, sensor device 216B may communicate directly with SOC 234A directly via GPIOs 228A, and the coexistence hub device 212 may communicate directly with SOC 234B directly via GPIOs 228B. Taking another example of sensor device 216B, sensor device 216B may send low latency data to SOC 234A via GPIOs 228 while sending latency tolerant data to SOC 234A or other components via multi-drop bus 220. Although not illustrated in FIG. 2, SPI, PCIe or both SPI and PCIe can also be used to provide an alternative or an additional communication mechanism. Although in FIG. 2, GPIOs 228A is described as interfacing sensor device 216B with SOC 234A, other physical interfaces such as serial peripheral interface (SPI), M-PHY or radio frequency front-end (RFFE) interface may be used instead. In one or more embodiments, sensor device 216B may not have direct access to multi-drop bus 220 and instead rely on SOC 234A to communicate over multi-drop bus via GPIOs 228A. In such embodiments, coexistence hub device 212 may control sensor device 216B via SOC 234A to address any coexistence issues.

Although not illustrated in FIG. 2, coexistence hub device 212 may also control the operations or access to one or more antennas (not shown) associated with the communication system.

Example Architecture of Coexistence Hub Device

Figure 3:
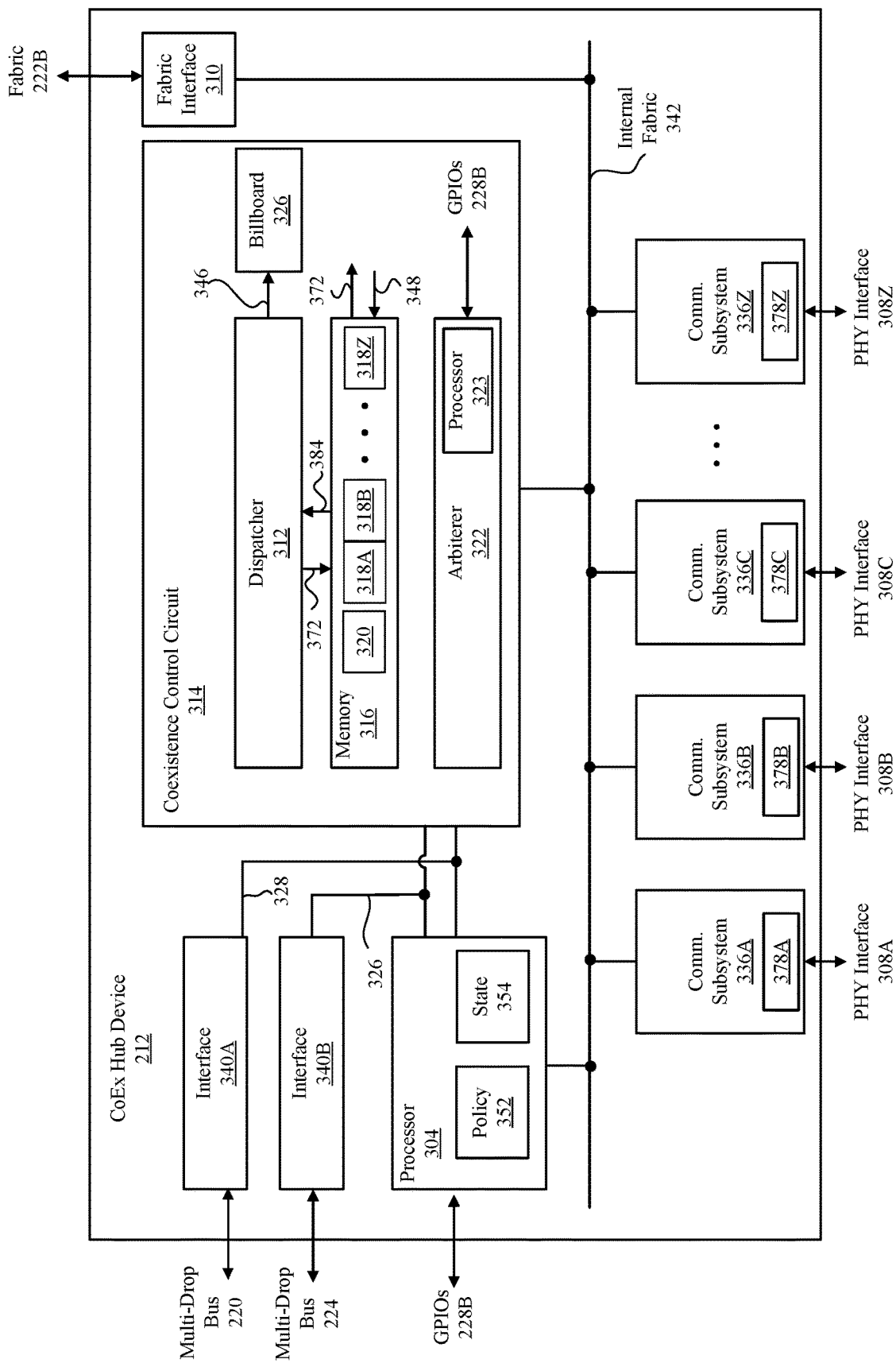
FIG. 3 is a block diagram illustrating a coexistence hub device, according to one embodiment.

FIG. 3 is a block diagram illustrating coexistence hub device 212, according to one embodiment. Coexistence hub device 212 is part of the communication system that coordinates operations of components in the communication system. Coexistence hub device 212 may also handle communication over protocols that are distinct from or partly overlap with communication performed by SOCs 234.

For this purpose, coexistence hub device 212 may include, among other components, a processor 304, a coexistence control circuit 314, fabric interface 310, multi-drop interfaces 340A, 340B (collectively referred to as "multi-drop interfaces 340"), communication subsystems 336A through 336Z (collectively referred to as "communication subsystems 336") and an internal fabric 352. Coexistence hub device 212 may include additional components not illustrated in FIG. 3 or may omit components illustrated in FIG. 3 (e.g., one or more of communication subsystems 336).

Processor 304 is a circuit, by itself or in conjunction with software or firmware, that controls the overall operation of the coexistence hub device 212 as well as coordinating operations of other SOCs 234 using coexistence messages. Processor 304 may include memory to store operation policy 352 for controlling the operations. The operation policy 352 may be received from application processor 208 via fabric 222B, fabric interface 310 and internal fabric 342. After receiving the operation policy 352, processor 304 may decode the operation policy 352 and program other components in coexistence hub device 212 (e.g., coexistence control circuit 314), if applicable, to enforce the operation policy 352. Additional information related to the operation policy 352 may also be received from application processor 208. Such additional may be stored or processed at processor 304 to affect how the operation policy 352 is implemented. Furthermore, processor 304 may send a portion of the operation policy 352 relevant to other SOCs 234, via multi-drop bus 220, to program SOCs 234 to operate according to the operation policy 352. The processor 304 may make coexistence decisions according to the operation policy 352 by analyzing coexistence messages (e.g., state information or requests) received via interface 340A from SOCs 234 and communication subsystems 336 as well as other messages (e.g., sensor signals) received via interface 340B. The processor 304 may store current states 354 of communication subsystems 336 in the coexistence hub device 212 and the other SOCs 234. Current states 354 may include, for example, radio frequency (RF) bands/channels in use by SOCs 234 and coexistence hub device 212, transmission power of radio signal. Such information may also be sent to application processor 208 or other SOCs 234 to enable real-time adjustment of operations in other SOCs 234. Processor 304 may delegate some coordination operations (e.g., coordination for communication subsystems 336) to arbiterer 322.

The operation policy as described herein refers to scenarios of operating combinations in the communication system that may be problematic or combinations of components having interworking issues, and also a set of rules that define the operations to be taken by SOCs 234 and coexistence hub device 212 to resolve or cope with such problematic scenarios. Such rules may be designed to take into account various considerations, including, but not limited to, resource usage, interference in shared or overlapping communication bands, and power usage. In one or more embodiments, the rules may be stored in the form of look up tables. These look up tables may be accessed by hardware, software, firmware or combinations thereof in processor 304 to implement the operation policy. In other embodiments, the operation policy may include firmware code and enable dynamic response to maintain a balanced operation between multiple communication subsystems. The rules or conditions of interference may only apply for a limited time in some cases, so the Hub will activate/deactivate a mitigation dynamically in response to a pattern of behavior that may be sent in advance or in response to messages received dynamically from the external system.

Processor 304 may also communicate with SOCs 234 or other components in electronic device 100 via GPIOs. Although FIGS. 2 and 3 illustrate coexistence hub device 212 as communicating with SOC 234B, the GPIOs may be omitted or other additional GPIOs may be provided with communication with other components in electronic device 100.

In one embodiment, processor 304 receives an entire operation policy from application processor 208 when coexistence hub device 212 is first initialized. In other embodiments, processor 304 receives relevant parts of the operation policy from application processor 208 as each communication subsystem 336 and/or SOCs 234 are turned on. In some embodiments, application processor 208 may continue to send context information to coexistence hub device 212 and other devices. Application processor 208 may also receive context information from coexistence hub device 212 SoCs 234. In this embodiment, the turning on of a communication subsystem 336 and/or SOCs 234 may be communicated to application processor 208, which causes application processor 208 to send the relevant portions of the operation policy to processor 304.

In another embodiment, processor 304 is pre-installed with default operation policy 352. In this embodiment, processor 304 does not receive operation policy from application processor 208. In such case, application processor 208 may send updated default operation policy 352 to coexistence hub device 212 for deployment. Such default operation policy 352 may be based on geographical region in which device 100 is operating so that regulatory restrictions in the geographical region may be satisfied.

Each of communication subsystems 336 includes a circuit to process signals received from or for sending to corresponding physical layer interfaces 308A through 308Z (collectively referred to as "physical layer interfaces 308")

external to coexistence hub device 212. Such circuits may include local processors 378A through 378Z (collectively referred to as "local processors 378") that perform one or more of the following operations: (I) execute commands associated with certain communication protocols, (ii) process received input communication signals according to a corresponding protocol to decode the input radio signals and respond by encoding certain responses within required time budgets on the RF link, (iii) control an associated radio frequency (RF) path to adjust transmit power or receive gain control, and (iv) configure, disable or enable components in the communication subsystem 336 based on the operation policy. All local processors 378 or at least a subset of these local processors 378 may be initialized (e.g., by application processor 208 or automatically) when coexistence hub device 212 is turned on. Among other things, the local processors 378 are programmed with a portion of the operation policy relevant to the operations of their communication subsystems 336. The operation policy downloaded to a local processor 378 of a communication subsystem 336 may define how the communication subsystem 336 should operate (e.g., the data rate of the communication subsystem, turning on or off of components in the communication subsystem 336, and changing the number of active transmitters or changing how those transmitters are configured to reduce disruption such as applying blanking or power back off for a particular duration). The policy may be only active for a repeated limited time duration so the communication subsystem 336 may dynamically engage or disengage a mitigation in response to the incoming messages from external systems to notify of a trigger event. Alternatively, the relevant portion of the operation policy may be sequentially downloaded and programmed directly by application processor 208 through fabric 222B or processor 304 as each of communication systems 336 are turned on. One or more of communication subsystems 336 may communicate with physical layer interfaces (e.g., RF devices) via, for example, Radio Frequency Front-End Control Interface (RFFE).

In some embodiments, physical layer interfaces 308 may be merged into a reduced set where a local processor 378 supports more than one communication protocols or switch between different communication protocols over time. Local processor 387 may control a fixed set of radio paths or only front-end switches, LNAs or PAs may be controlled by physical layer interfaces 308.

Interfaces 340A, 340B are hardware circuits or combinations of hardware circuits, software and firmware for communication with multi-drop buses 220, 224. In one or more embodiments, interfaces 340A, 340B include circuits for processing data into outbound datagrams for sending over SPMI and unpacking inbound datagrams into data. The interfaces 340A, 340B are connected to processor 304 and coexistence control circuit 314 via connections 328, 326, respectively.

Fabric interface 310 is a hardware circuit or a combination of hardware circuit, software and firmware for enabling coexistence hub device 212 to communicate with application processor 208 over fabric 222B. In one or more embodiments, fabric interface 310 performs operations such as buffering, segmenting/combining data, serializing/deserializing and packaging/unpacking of data for communication over a point-to-point communication channel (e.g., PCIe). As illustrated in FIG. 3, fabric interface 310 is connected to internal fabric 342 to enable communication of components in coexistence hub device 212 with application processor 208.

Coexistence control circuit 314 is a circuit, by itself or in conjunction with firmware or hardware, that processes coexistence messages transmitted over multi-drop bus 220. Coexistence control circuit 314 is programmed by processor 304 to enforce the operation policy 352 by making real time decisions on coexistence events, distribute inbound coexistence messages to relevant communication subsystems 336, sharing real time coexistent messages among communication subsystems 336 and sending outbound coexistence messages to other SOCs 234. The coexistence event described herein refers to a condition or occurrence defined by the operation policy that would prompt coordinating of operations in components of electronic device 100.

Specifically, coexistence control circuit 314 may include, among other components, dispatcher 312, memory 316, arbiterer 322, and billboard 326. The dispatcher 312 is a programmable circuit or a circuit in combination with software or firmware for filtering and sending messages for each communication subsystems 336 to memory 316. In a multithreaded system, there may be multiple such memories 318A through 318Z, to enable multiple systems to have coexistence messages sent or received in parallel. The details of the dispatcher 312 and its functions are described below in detail with reference to FIG. 3.

Memory 316 has multiple buffers 318A through 318Z (collectively referred to as "buffers 318") where each buffer corresponds to each of communication subsystems 336. Each of buffers 318 receives and stores inbound coexistent messages (received from components outside coexistence hub device 212 via multi-drop bus 220) relevant to a corresponding communication subsystem 336. The stored inbound coexistent messages in a buffer 318 may be sent to a corresponding communication subsystem 336 (as indicated by arrow 372) based on priority (e.g., time sensitive data has a higher priority relative to time insensitive data) via an internal fabric 342. If one or more communication subsystems 336 are inactive, the buffers 318 stores the messages until the communication systems 336 are turned on and become available to receive the messages. In one or more embodiments, different buffers 318 may be associated with different priorities. When a buffer assigned with high priority is filled with a message, a communication system 336 may wake up to service to ensure that the message is handled in a timely manner. Each of buffers 318 also stores outbound coexistence messages 348 (received from a corresponding communication subsystem 336 via internal fabric 342). The outbound coexistence messages are retrieved by dispatcher 312 and sent out over multi-drop bus 220 to components outside coexistence hub device 212, also based on priority (e.g., time sensitive data has a higher priority relative to time insensitive data).

Memory 316 also include shared memory section 320 that may be accessed by arbiter 322 to resolve conflicting use of resources and by different local processors 378 to exchange time-sensitive coexistence messages among communication subsystems 336. Communication subsystems 336 may submit their tasks along with requests from other SOCs 234 to memory queues to be serviced by arbiterer 322.

Memory 316 may also be used to share context information between different communication subsystems 336. For example, the context information may be used to plan and sort activities that uses radio resources in advance. By planning timeline in advance, an enhanced coexistence operations may be performed. The planning could also sort the activities in a manner that offers better immunity to jammers and blockers at the cost to inband SNR.

Billboard 326 is a circuit, by itself or in conjunction with software or firmware, that stores state information of communication subsystems 336. The status information 346 is received from communication subsystems 336 and stored for access. Billboard 326 enables a communication subsystem in the coexistence hub device 212 or an external component to accurately determine operating context of another system by accessing the state information in billboard 326. In one or more embodiments, other SoCs 234 may also include billboards that enable SOCs 234 to advertise their context concurrently. The billboard may include a memory region. An incoming message into the memory region of the billboard may trigger a communication subsystem to respond within a predetermined time. In one or more embodiments, billboard 326 is also be used as a ping-pong buffer for exchanging signals or data between SOCs 234 over multi-drop buses 220, 224 if SOCs 234 cannot perform direct messaging among themselves for some reasons.

Arbiterer 322 is a circuit, by itself or in conjunction with software or firmware, that makes decisions on real time coordination of operations of communication subsystems 336 and sends out the decisions to the communication subsystems 336 over internal fabric 342 and memory 316. Such decisions may include resolving competing needs of common resources by multiple communication subsystems 336 or requests for incompatible resources by different communication subsystems 336. Arbiterer 322 makes the decisions in real time, which may remain effective for a shorter time period compared to decisions made at processor 304 to implement the operation policy 352. In addition, arbiterer 322 may resolve requests for use of resources by external communication subsystems that compete with the local communication subsystems 336 for use of the same resource. For this purpose, arbiterer 322 may access current states 354 of communication subsystems 336 and the other SOCs 234 stored in processor 304 as well as using information about the priority of the different competing operations. The algorithm for resolving the resource conflicts at arbiterer 322 may be adjusted based on the operation policy 352 executed by processor 304. Arbiterer 322 may be programmed by processor 304 or application processor 208. The decision made by arbiter 322 may include controlling RFFE transactions associated with communication subsystems 336, for example, to change the settings of an external RF device. Such operation may include blanking a power amplifier transmission of corresponding communication subsystem 336. Because the real time decisions are sent out over shared internal fabric 342, a communication subsystem (e.g., communication subsystem 336A) may receive the decisions intended for another communication subsystem (e.g., communication subsystem 336B) and adjust its operations accordingly. Arbiterer 322 may include processor 323 to control the overall operation of arbiterer 322.

In one or more embodiments, arbiterer 322 may communicate with components external to coexistence hub device 212 via GPIOs 228B for low latency data. For example, arbiterer 322 may receive sensor data from one or more of sensors 216 and make real time decisions. Alternatively, arbiterer 322 may control a communication subsystem by GPIOs and disable other communication subsystems. In another embodiment, arbiter 322 assists the communication systems in managing the response to asynchronous unexpected external blockers, and manage the radio response to avoid impaired performance due to the sudden appearance of the external jammer, or blocker by disabling the impacted radio path and triggering the associated firmware/software to enable the radio path but with a higher linearity to sustain the link despite the jammer even at a reduce in-band SNR or error vector magnitude (EVM) performance.

In one or more embodiments, processor 304 determines a larger scale coordination operation based on its operation policy 352, and configures components of coexistence control circuit 314, communication subsystems 336 and possibly SOCs 234 to enforce the operation policy 352. Arbiterer 322, on the other hand, coordinates a smaller scale, real time coexistence operations that are consistent with the larger scale coordination operation as defined by operation policy 352.

Example Architecture of Dispatcher

Figure 4:
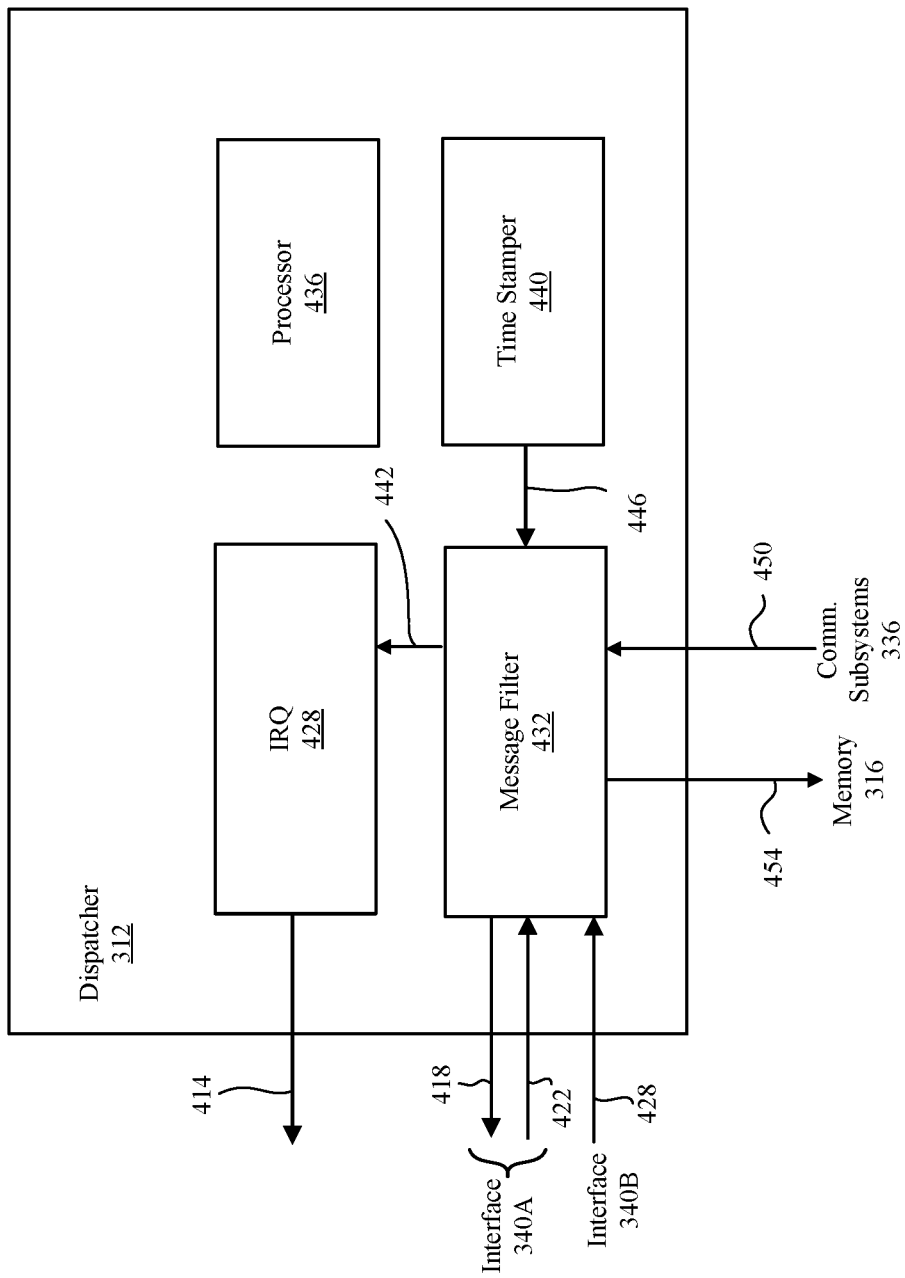
FIG. 4 is a block diagram of a dispatcher in the coexistence hub device of FIG. 3, according to one embodiment.

FIG. 4 is a block diagram of dispatcher 312 in coexistence hub device of FIG. 3, according to one embodiment. Dispatcher 312 is a circuit or a combination of circuit, software and/or firmware for processing coexistence messages. Dispatcher 312 determines whether requests or coexistence message from communication subsystems 336 should be sent in which order/priority to SOCs 234, and if so, forwards the request or coexistence messages via the multi-drop bus 220. Dispatcher 312 also receives coexistence messages from SOCs 234 and forwards the relevant subset of all these messages to the communication subsystems 336 such that each of these subsystems 336 receives only relevant messages. Dispatcher 312 may include, among other components, processor 436, interrupt manager 428, time stamper 440 and message filter 432. One or more of interrupt manager 428, time stamper 440 and message filter 432 may be embodied as firmware of software executed by processor 436. Also, additional components may be added to dispatcher 312.

Processor 436 is a circuit that may perform various operations in dispatcher 312 such as (i) managing contending resources within each communication subsystem 336, (ii) control external RF control blocks outside of coexistence hub device 212, (iii) support the functions and operations of arbiterer 322, and (iv) coordinating reporting of the results from arbiterer 322 to components on the multidrop bus 220. Processor 436 may be a part of processor 304 or it may be a standalone processor. Processor 436 may also update the operations of other components in dispatcher 312 over time or depending on the activities in electronic device 100.

Message filter 432 is hardware, software, firmware or a combination thereof that receives inbound coexistence messages 422 from multi-drop bus 220 via interface 340A, filters inbound coexistence messages 422 for relevancy to communication subsystems 336, and sends the filtered inbound coexistent messages 454 to appropriate buffers 318 and/or shared section 320 of memory 316. Message filter 432 may also redirect the inbound coexistent messages 454 to buffers associated with communication subsystems 336 other than a default communication subsystem 336 to ensure that the active communication subsystems 336 receives all relevant inbound coexistence messages. By configuring message filter 432, a communication system (e.g., 336A) may receive an inbound coexistence message intended for another communication system (e.g., 336B) as well and take such inbound coexistent message into account for its operation. The message filter may also be operational when the communication subsystems 336 are in radio sleep state to receive a limited set of messages from external SoCs to record some important change of state of an external system that may impact a communication subsystem 336 that is in radio sleep, or to request a limited set of functions on the communication subsystem 336 wake briefly to permit sharing of an external shared device. Message filter 432 may also perform the same operation for inbound sensor messages received from the interface 340B. If an inbound coexistence message includes an interrupt, the message filter 432 sends the corresponding coexistence message 442 to interrupt manager 428.

Interrupt manager 428 is hardware, software, firmware or a combination thereof that manages interrupts. When interrupt manager 428 receives the coexistence message 442 including an interrupt, interrupt manager 428 extracts the interrupt and sends out an interrupt signal 414 to corresponding communication subsystem 336. The interrupt signal 414 can cause the corresponding communication subsystem 336 to shut down, power down a subset of its components, wake-up from a power down mode or indicate real time state of components on multi-drop bus 220 (e.g., SOCs 234). These interrupt signals may only involve a simple decoder and no microprocessor, which enables low cost components to send interrupt signals for communicating simple coexistence message over multi-drop bus 220. One of the characteristics of the interrupt signals is that they are sticky, meaning that even if an SOC (e.g., SOC 234B) is asleep when a coexistence hub device 212 sends an interrupt signal, the SOC (e.g., SOC 234B) will respond to the interrupt signal after the SOC (e.g., SOC 234B) wakes up at a later time. These interrupt signals can also be used to guarantee that an external SOC (e.g., SOC 234B) may abruptly enter an inactive/sleep state without requiring other components (e.g., SOC 234A) to stay awake long enough to complete handshake operations with the SOC (e.g., SOC 234B). By using always on interrupt signals, the burden on the originating message source may be reduced.

Message filter 432 may also receive interrupt signal 450 from communication subsystems 336. If the interrupt signal 450 is intended for SOCs 234, message filter 432 sends the interrupt 450 as an outbound coexistence message 418 to interface 340A for sending out via multi-drop bus 220. An interrupt signal between the communication subsystems 336 is transmitted over internal fabric 342 without intervention of coexistence control circuit 314.

Time stamper 440 is a circuit that keeps track of time for incoming and outgoing messages on multi-drop bus 220. In some embodiments, more than one SoC operate from the same reference time. By stamping the incoming messages with the internal reference time, coordination between SOCs can be performed more tightly. The time of arrival may also be used to determine the approximate time at which a radio resource is to be released (e.g., if the delay to disable is included in the incoming message). Time stamper 440 tracks the actual time the messages are sent or received to account for arbitration delays. The time stamper 440 may be used to monitor the actual disruption of the link by the external system so that the local system can revise a pattern of behavior that was sent in advance to the victim system of when to expect disruptions. In systems where the duration of the coexistence problems is short in nature, it is advantageous to be able to track the intervals of upcoming disruptions to enable radios to avoid planning some activities during those times, or take some mitigation actions such as repeating transmission packets during this interval to help the reliability of the radio network which is communicating with device 100 in managing the reduced performance.

Example Architecture of SOC

Figure 5:
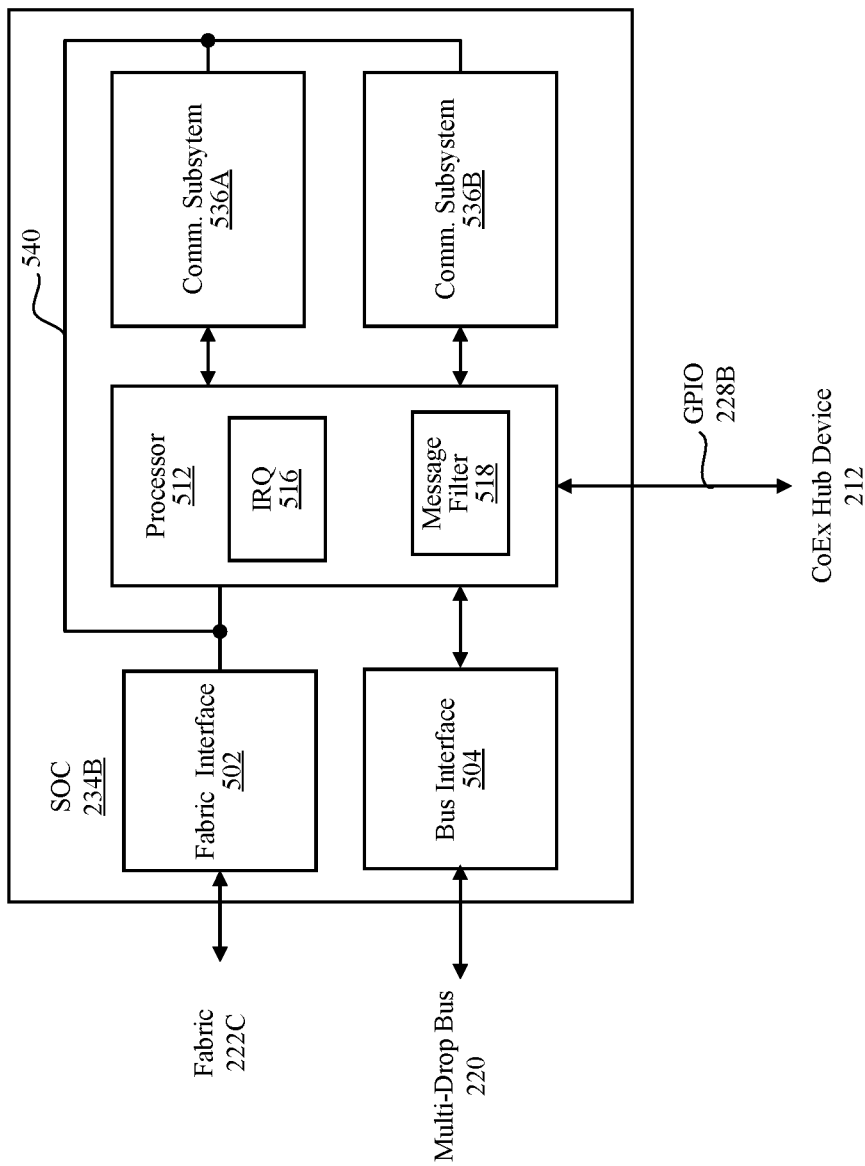
FIG. 5 is a block diagram a SOC, according to one embodiment.

FIG. 5 is a block diagram SOC 234B, according to one embodiment. Although SOC 234B is illustrated in FIG. 5 as an example, other SOCs 234A, 234C through 234N may have the same or similar architecture as SOC 234B.

SOC 234B is part of the communication system in electronic device 100 and can execute one or more communication protocols using its communication subsystems 536A, 536B (collectively referred to as "communication subsystems 536"). Although only two communication subsystems 536A, 536B are illustrated in FIG. 5, more than two communication subsystems or only a single communication subsystem may be included in SOC 234B. Although two communication subsystems 536A and 536B are illustrated in FIG. 5, there may be a common radio to support both communication subsystems 536A, 536B in a time-shared manner or a radio that is reconfigured between different modes to support both communication subsystems 536A and 536B. Communication subsystems 536A, 536B may be each associated with different communication protocols, or both may be associated with the same communication protocol. Communication subsystems 536 are substantially identical to communication subsystems 336 except that coexistence messages associated with communication subsystems 536 are processed by processor 512 instead of coexistence control circuit 314. Communication subsystems 536 can send coexistence messages over multi-drop bus 220 to coexistence hub device 212 to coexist with communication subsystems in coexistence hub device and/or other SOCs. Inbound coexistence messages to SOC 234B are processed locally by processor 512 and sent to corresponding communication subsystems 536. Other detailed explanation on communication subsystems 536 is omitted herein for the sake of brevity.

In addition to communication subsystems 536, SOC 234B may further include, among other components, fabric interface 502, bus interface 504, processor 512, and an internal bus 540 for connecting these components. SOC 234B may include further components such as memory for buffering coexistence messages associated with each communication subsystems 536.

Bus interface 504 is a circuit, by itself or in conjunction with software or hardware, that enables components of SOC 234B to communicate with coexistence hub device 212 and other SOCs over multi-drop bus 220.

Fabric interface 502 is a circuit, by itself or in conjunction with software or hardware, that enables components of SOC 234B to communicate with application processor 208 over fabric 222C. The communication of fabric interface 502 is capable of transmitting data at faster speed and higher bandwidth than the communication over bus interface 504.

Processor 512 manages overall operation of SOC 234B. Processor 512 may include, among others, interrupt manager 516 and message filter 518 as software or hardware components. The functions and operations of interrupt manager 516 and message filter 518 are substantially the same as those of interrupt manager 428 and message filter 432, and therefore, detailed explanation of these components is omitted herein for the sake of brevity.

Processor 512 may also communicate with other components of electronic device 100 via GPIOs. In the example of FIG. 5, processor 512 is illustrated as communicating with coexistence hub device 212 over GPIOs 228B. But GPIOs 228B may be omitted, and a SPI bus or another communication link could be used instead for processor 512 to communicate directly with other components of electronic device 100 to transmit time-sensitive data.

Processor 512 and/or communication subsystems 536 may be programmed by processor 304 of coexistence hub device 212 or application processor 208 to implement operation policy 352. In one embodiment, such programming may be performed when the SOC 234B is turned on.

Example Process of Coordinating Coexistence Operations

Figure 6:
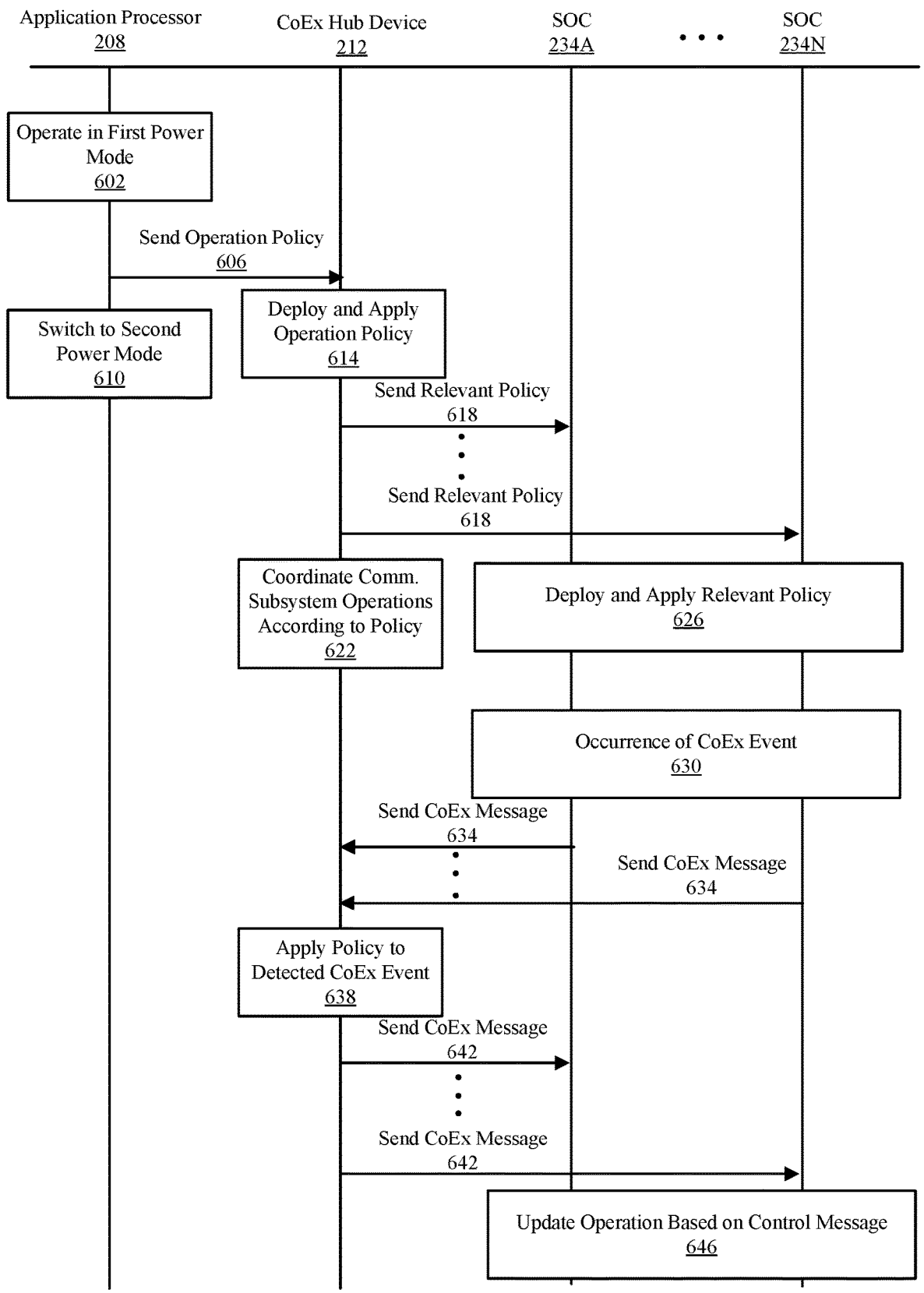
FIG. 6 is an interaction diagram illustrating operations and interactions of components in the electronic device, according to one embodiment.

FIG. 6 is an interaction diagram illustrating operations and interactions of components in electronic device 100, according to an embodiment. Application processor 208, operates 602 in a first power mode (e.g., full power mode). While in the first power mode, application processor 208 sends 606 the operation policy to coexistence hub device 212 over fabric 212B. Application processor 208 may also send 618, to SOCs 234, initial operation policy relevant to SOCs 234 over corresponding fabrics 222. After application processor 208 sends out the operation policy, application processor 208 may switch 610 to a second power mode (e.g., reduced power mode or sleep mode). Application processor 208 may continue to send updates to coexistence hub device 212 and other SoCs 234s.

Coexistence hub device 212 then deploys and starts applying 614 the operation policy. Coexistence hub device 212 may also send operation policy relevant to SOCs 234 for initializing or updating rules of operating the SOCs 234. For example, the relevant operation policy may be sent to a SOC for initializing when the SOC is turned on.

Coexistence hub device 212 coordinates 622 operations of its communication subsystems according to the operation policy. Such operations include programming coexistence control circuit 314 and processors 378 of communication subsystems 336. If one or more of communication subsystems 336 are turned off, the programing operation may be performed after communication subsystems 336 are turned on.

After SOCs 234 receives relevant operation policy (either from application processor 208 or coexistence hub device 212), SOCs 234 may deploy and apply 626 relevant policy to their operations. The SoCs 234 may keep other SoCs and application processor 208 informed of changes in its configuration relevant to coexistence with other SOCs. This enables SoCs 234 to plan their appropriate configuration to reduce impact stemming from other SOCs.

When a coexistence event occurs 630 (e.g., experiencing of wireless signal interference in one of the SOCs or a known trigger event such as the use of a particular resource that can impact another SoC), SOCs 234 experiencing the event sends 634 a coexistence message 634 to coexistent hub device 212 over multi-drop bus 220. Alternatively, SoC 234s that initiate the trigger event may promptly inform coexistence hub device 212 and impacted SoCs of such change. SoCs 234 may be unable to completely resolve how to respond to the external trigger event by themselves. In such cases, the SOCs 234 may coordinate via application processor 208 for additional data such as regulatory information or with changing a clock plan of related codependent hardware signals. Coexistence hub device 212 may respond to the received coexistence message by applying 638 operation policy and taking actions to address the coexistence event, as described below in detail with reference to FIG. 7. The policy may also imply that certain SoCs 234 are restricted from using certain modes of operation, while another SoC is operating in a condition where its performance would be significantly impacted by the trigger event. In addition to coexistence hub device 212, other SOCs 234 may also receive the coexistence message over the shared multi-drop bus 220 and adjust its operations in response.

The actions to be taken by coexistence hub device 212 include adjusting operations of one or more of its communication subsystems 336 and/or generating and sending 642 another coexistence message 642 including commands or interrupts to other SOCs 234 to control their operations.

In response to receiving the coexistence message including the commands or interrupts, the SOCs 234 relevant to the coexistence message, updates 646 their operations, according to the commands or interrupts in the coexistence message to accommodate the poor radio conditions. The SoCs 234 can monitor the impact of the aggressor, and report the impact to coexistence hub device 212, so that coexistence hub device 212 can take further action on the aggressor to improve the link conditions for the victims.

In addition to or alternative to sending 642 the coexistence message, coexistence hub device 212 may update operations of its communication subsystems 336 to address the coexistence event according to operation policy 352.

Although FIG. 6 illustrates a scenario where the coexistence event occurs in SOCs 234, a coexistence event may occur within coexistence hub device 212. In such instances, coexistence hub device 212 may update operations of its components or send 642 coexistence messages including commands to relevant SOCs 234 to cope with its coexistence event. A similar set of responses can occur within coexistence hub device 212 when two communication subsystems are impacted as occur externally between SoC 234s.

By having coexistence hub device 212 process coexistence messages and address coexistence events without involving application processor 208, application processor 208 may remain in the second power mode 610 without consuming additional power. In addition to or alternatively, the resources (e.g., computing resources) at application processor 208 may be preserved for other operations, even if application processor 208 is in the first power mode. Further, greater autonomy among the SoCs and a faster coordination may be enabled.

The processes and their sequences illustrated in FIG. 6 are merely illustrative. Additional processes may be added and some processes in FIG. 6 may be omitted. For example, the process of sending relevant policy 618 from coexistence hub device 212 to SOCs may be omitted and instead rely solely upon application processor 208 to send the relevant policy to SOCs 234. Also, application processor 208 may remain in the first power mode after sending 606 to coexistence hub device 212 without switching to the second power mode.

Further, although not illustrated in FIG. 6, application processor 208 may send updated operation policy for deployment and application after an initial operation policy is deployed in coexistence hub device 212. The updated operation policy may be determined based on detection of any events by application processor 208 or after reading of the current state 354 in coexistence hub device 212.

Figure 7:
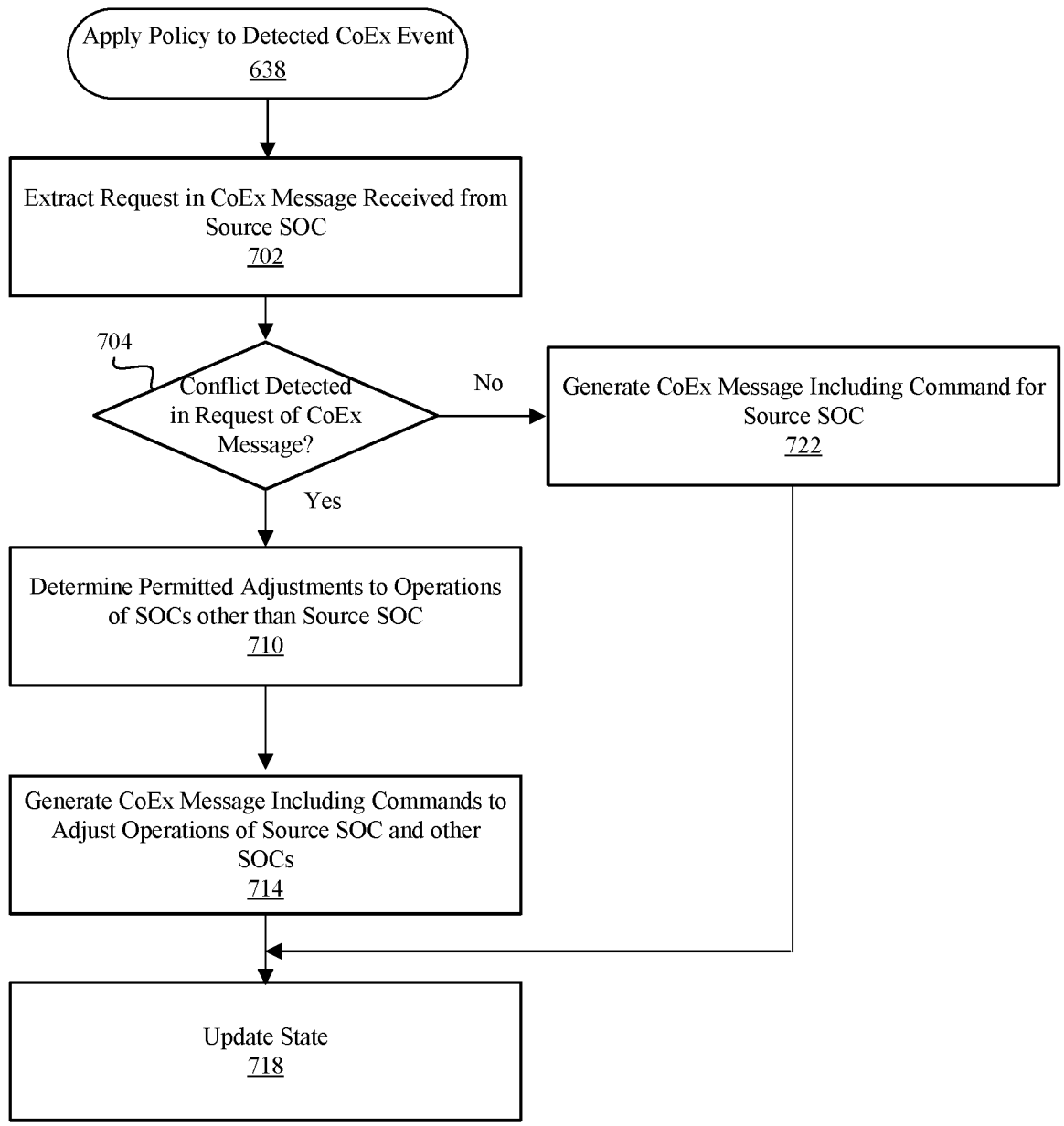
FIG. 7 is a flowchart illustrating a process of applying operation policy to detected coexistence event, according to one embodiment.

FIG. 7 is a flowchart illustrating a process of applying 638 the operation policy to detected coexistence event, according to one embodiment. A request in coexistence message from a source SOC (e.g., SOC 234A) is extracted 702 by coexistence hub device 212.

Coexistence hub device 212 determines 704 whether a conflict is detected in the request in the coexistence message. If so, coexistence hub device 212 determines permitted adjustments to the operations of SOCs other than source SOCs (SOC 234A) and communication subsystems 336 in coexistence hub device 212 according to the operation policy.

Coexistence hub device 212 then generates coexistence message including commands for sending out over multi-drop bus 220 to SOCs 234. The commands instruct the SOCs 234 to adjust their operations.

If there is no conflict detected, coexistence message including command for adjusting the operation of the source SOC (e.g., SOC 234A) is generated 722 for sending over multi-drop bus 220.

The current state 354 of the SOCs 234 and communication subsystems 336 in coexistence hub device 212 is updated 718.

The processes and their sequences illustrated in FIG. 7 are merely illustrative. Additional processes may be added and some processes in FIG. 7 may be omitted. For example, the process of updating 718 the current state may be performed after determining 710 permitted adjustments.

FIG. 8 is a table illustrating requests in coexistence messages, and corresponding possible responses made by coexistence hub device 212, according to one embodiment. The first column of the table includes various requests that can be made by SOCs 234 and communication subsystems 336 in coexistence hub device 212. The second column of the table indicates corresponding responses or commands that can be included in a coexistence message in response to the request. "Accept" indicates that the request made by the SOCs 234 and communication subsystems 336 are accepted. "Reject" indicates that the request made by the SOCs 234 and communication subsystems 336 are rejected, and the source SOCs continues to operate in its current mode of operation. "Notify alternative frequency band," "permit smaller power increase," "permit smaller power decrease," and "notify alterative antenna" are actions that are neither acceptance or rejection, but alternative course of actions to be taken by SOCs 234 or communication subsystems 336.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A coexistence hub device, comprising:
a first interface circuit configured to communicate over a multi-drop bus that is connected to communication chips in an electronic device;
a second interface circuit configured to communicate with a central processor in the electronic device over a point-to-point connection; and
a processor circuit configured to:
receive an operation policy representing problematic scenarios of operating combinations in the communication chips and rules for resolving the scenarios from the central processor,
deploy the received operation policy,
receive a first coexistence message from at least one communication chip via the first interface and the multi-drop bus,
determine whether one or more of the problematic scenarios has occurred by at least processing the received coexistence message, and
generating a second coexistence message representing a command to update an operation of at least one of the communication chips by applying the operation policy, responsive to determining that the one or more of the problematic scenarios has occurred.

2. The coexistence hub device of claim 1, further comprising:
at least one communication subsystem configured to implement a communication protocol, wherein an operation of the at least one communication subsystem is updated by the processor circuit, responsive to determining that the one or more of the problematic scenarios has occurred.

3. The coexistence hub device of claim 2, further comprising a coexistence control circuit configured to:
coordinate operations of the at least one communication subsystem according to the operation policy.

4. The coexistence hub device of claim 3, wherein the coexistence control circuit is further configured to:
filter inbound coexistence messages from the communication chips for forwarding to memory associated with the at least one communication subsystem; and
send the stored inbound coexistence messages to the at least one communication subsystem.

5. The coexistence hub device of claim 4, wherein the at least one communication subsystem, the processor circuit and the coexistence control circuits are connected to an internal fabric.

6. The coexistence hub device of claim 2, wherein the processor is further configured to program the at least one communication subsystem according to the operation policy responsive to turning on of the at least one communication subsystem.

7. The coexistence hub device of claim 1, wherein the first coexistence message or the second coexistence message includes an interrupt.

8. The coexistence hub device of claim 7, wherein the interrupt causes turning on or turning off of a component in the coexistence hub device.

9. The coexistence hub device of claim 1, further comprising a third interface configured to communicate with at least one sensor device over another multi-drop bus, wherein the processor circuit determines whether the one or more of the problematic scenarios has occurred by further processing a sensor message received from the at least one sensor device.

10. The coexistence hub device of claim 1, wherein the central processor switches from a first power mode to a second power mode consuming less power than the first power mode after sending the operation policy to the coexistence hub device.

11. The coexistence hub device of claim 1, further comprising a billboard circuit configured to buffer a signal over the multi-drop bus between the communication chips.

12. A method of coordinating operations of communication chips in an electronic device, comprising:
receiving, by a coexistence hub device, an operation policy representing problematic scenarios of operating combinations in the communication chips and rules for resolving the scenarios from a central processor;
deploying the received operation policy in the coexistence hub device;
receiving, by the coexistence hub device, a first coexistence message from at least one communication chip via a multi-drop bus;
determining, by the coexistence hub device, whether one or more of the problematic scenarios has occurred by at least processing the received coexistence message;
generating, by the coexistence hub device, a second coexistence message representing a command to update an operation of at least one of the communication chips by applying the operation policy, responsive to determining that the one or more of the problematic scenarios has occurred; and sending, by the coexistence hub device, the second coexistence message to the communication chips via the multi-drop bus.

13. The method of claim 12, further comprising:
implementing a communication protocol by at least one communication subsystem in the coexistence hub device; and
updating an operation of the at least one communication subsystem responsive to determining that the one or more of the problematic scenarios has occurred.

14. The method of claim 13, further comprising coordinate operations of the at least one communication subsystem according to the operation policy.

15. The method of claim 13, further comprising:
filtering inbound coexistence messages from the communication chips for forwarding to memory associated with the at least one communication subsystem; and
sending the stored inbound coexistence messages to the at least one communication subsystem.

16. The method of claim 12, wherein the first coexistence message or the second coexistence message includes an interrupt.

17. The method of claim 12, further comprising communicating with at least one sensor device over another multi-drop bus, wherein whether the one or more of the problematic scenarios has occurred is determined by further processing a sensor message received from the at least one sensor device.

18. The method of claim 12, wherein the central processor switches from a first power mode to a second power mode consuming less power than the first power mode after sending the operation policy to the coexistence hub device.

19. The method of claim 12, further comprising buffering a signal over the multi-drop bus between the communication chips.

20. An electronic device comprising:
a central processor;
a plurality of communication chips;
a multi-drop bus that is connected to the communication chips; and
a coexistence hub device, comprising:
a first interface circuit configured to communicate over the multi-drop bus;
a second interface circuit configured to communicate with the central processor i over a point-to-point connection; and
a processor circuit configured to:
receive an operation policy representing problematic scenarios of operating combinations in the communication chips and rules for resolving the scenarios from the central processor via the point-to-point connection,
deploy the received operation policy,
receive a first coexistence message from at least one communication chip via the first interface and the multi-drop bus,
determine whether one or more of the problematic scenarios has occurred by at least processing the received coexistence message, and
generating a second coexistence message representing a command to update an operation of at least one of the communication chips by applying the operation policy, responsive to determining that the one or more of the problematic scenarios has occurred.

* * * * *